Sept. 13, 1966  M. CARRIER  3,272,076
MACHINE FOR CUTTING SPECTACLE-LEGS OR THE LIKE
Filed March 2, 1965  2 Sheets-Sheet 1

INVENTOR
Michel Carrier
BY
ATTORNEYS

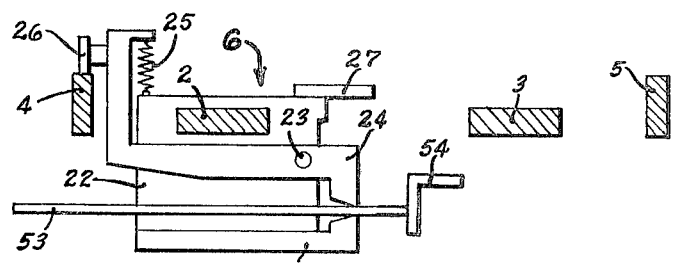
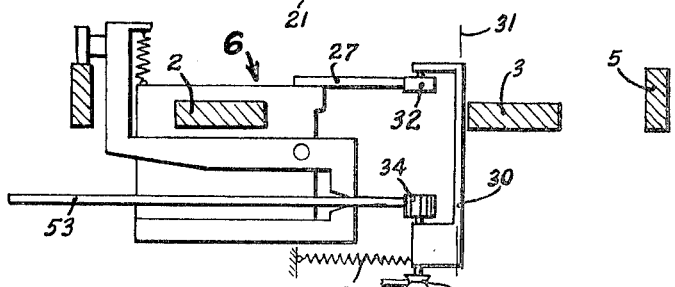
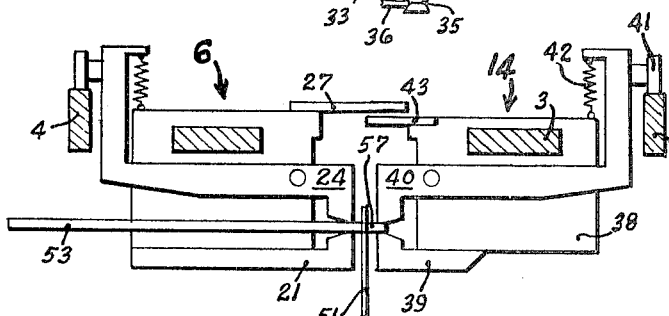
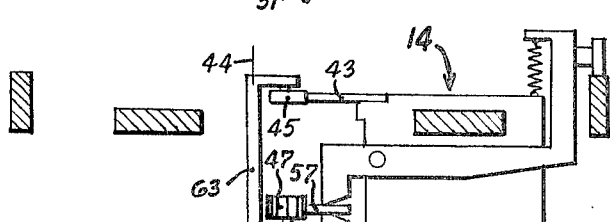
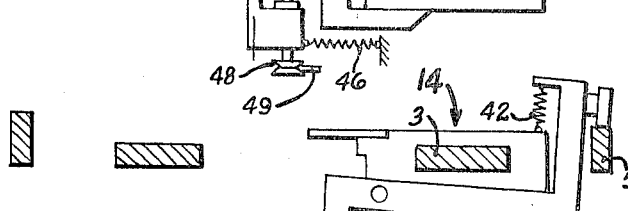

3,272,076
MACHINE FOR CUTTING SPECTACLE-LEGS
OR THE LIKE
Michel Carrier, 31 Rue Pasteur, Oyonnax, France
Filed Mar. 2, 1965, Ser. No. 436,568
Claims priority, application France, Mar. 9, 1964,
44,560, Patent 1,396,560
5 Claims. (Cl. 90—13)

The present invention relates generally to a machine adapted to cut elements having various shapes from plate materials such as plastics, and more particularly for the manufacture of spectacle-frames or spectacle-legs.

In the manufacture of spectacle-frames or legs, the known methods are generally carried out at relatively high temperature which results in a partial melting of the plastics.

An object of the invention is to eliminate this drawback and to cut shaped elements of the class described in a completely automatic process.

These objects are accomplished in a machine according to the invention, wherein a first vice slidably mounted on the machine frame displaces the protruding portion of a plate in a longitudinal movement along a first milling-cutter having its axis moved transversely with respect to said plate by means of a first gauge-and-feeler mechanism in order to cut on said plate protruding portion the first half of the desired profile, and a second vice adapted to automatically grip said plate protruding portion automatically removed from said first vice, and to displace it in a longitudinal movement along a second milling-cutter having its axis moved transversely with respect to said plate protruding portion by means of a second gauge-and-feeler mechanism in order to cut on said plate protruding portion the second half of the desired profile. After releasing of the machined portion, each vice is brought back to its original position which results in a longitudinal reciprocating motion for each vice, both being opposite one another when said plate portion is transmitted from the first vice to the second one.

In a preferred embodiment of the invention, the opening and locking of each vice is effected by a cam-and-roller system. The machine object of the invention is thus automatically operated: it is only sufficient to supply the first vice with plastics plates which are released by the second vice, cut in the desired profile.

In the drawings:

FIGS. 7, 8, 9 and 10 are transverse sections of the machine shown in FIG. 1, illustrating successive operation steps.

FIG. 11 is a similar side view of the machine when the resulting part, spectacle-leg or the like, is released from the second vice.

The machine shown in FIGS. 1 to 11 comprises stationary frame 1 provided with two horizontal guides 2 and 3 located above each other, and with two stationary cams 4 and 5 shaped as hereunder described.

Figure 2:
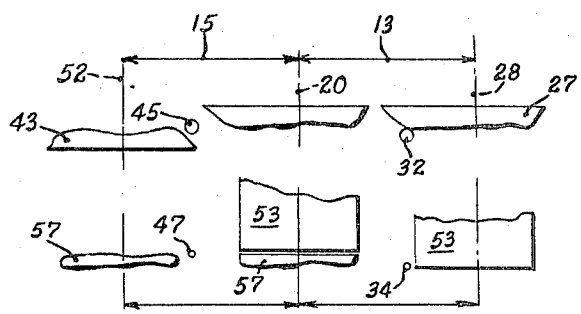
FIG. 2 is an explanatory scheme illustrating the operation principle.
Figure 3:
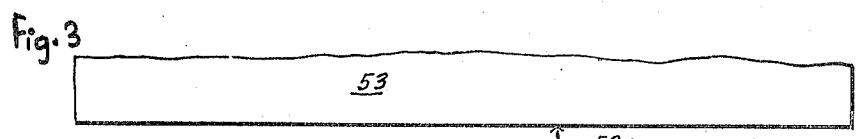
FIG. 3 is a part view of a plastics plate as mounted on the first vice.

Upper guide 2 slidably carries a first vice 6 adapted to be moved horizontally by means of articulated levers 7 and 8. The lower end of lever 7 is hinged to an axis 9 on frame 1. A roller 10 mounted on the side of said lever 7 engages in a guiding groove 11 provided on one of the flat faces of a rotary plate 12. The latter being rotated about its horizontal axle 12a and said guiding groove 11 being set off centre, it will be understood that the lever 8 is moved in an oscillating movement about axis 9. This results in a horizontal reciprocating movement of first vice 6 which slides on upper guide 2 with an amplitude 13 (FIG. 2).

Figure 1:
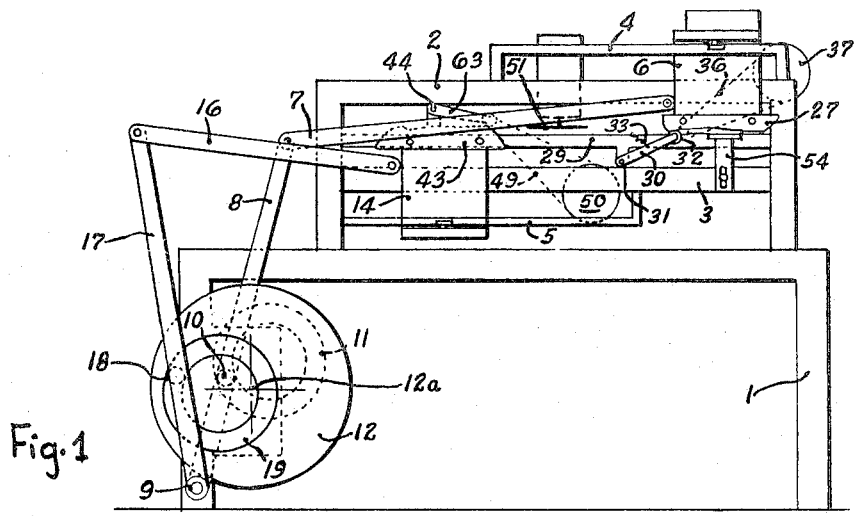
FIG. 1 is a general view of a machine object of the invention.

In the same manner, a second vice 14 is slidably mounted on lower guide 3 whereon it is reciprocated with an amplitude 15 (FIG. 2) by means of articulated levers 16 and 17 (FIG. 1). Lever 17 is hinged to axis 9 at its lower end, and it is provided with a lateral roller 18 engaging in a groove 19 located on the other flat face of rotary plate 12.

The grooves 11 and 19 are profiled and angularly located with respect to each other on rotary plate 12 in such a manner that vices 6 and 14 are reciprocated according to synchronous movements and periodically located opposite above each other in the middle plane 20 (FIGS. 2 and 9), whereafter they move away from each side of the latter.

First vice 6 has a jaw 21 (FIG. 7) rigidly secured to a support 22 slidably mounted on guide 2. A counter-jaw 24 is hinged to an axle 23 of said support 22. Said counter-jaw 24 is urged towards fixed jaw 21 by means of a roller 26 rolling on the profiled upper face of cam 4. On the contrary, the counter-jaw is opened by means of a return-spring 25 when this is rendered possible by cam 4.

The support 22 is provided with a first gauge 27 (FIGS. 1, 2, 7, 8) having a profile identical to the first half of the profile to be cut in order to make a spectacle-leg or the like.

As a result of the shape of cam 4, the first vice 6 is opened at each stroke-end of its reciprocating movement, namely when it is located in the middle plane 20 (FIG. 2).

A stationary transverse bar 29 (FIG. 1) is rigidly secured to the frame 1 and provided with a cut-milling head 30 which may be pivoted about a supporting axle 31. Said cut-milling head 30 (FIGS. 2 and 8) is provided with a feeler 32 urged against the gauge 27 by means of a spring 33, and with a milling-cutter 34. The feeler 32 is kept in contact with gauge 27 when the latter is displaced together with first vice 6 along upper-guide 2. The milling-cutter 34 is rotated by a pulley 35 (FIG. 8) and a belt 36 (FIG. 1), the latter being driven by a motor 37 mounted on the frame 1. The motor 37 is mounted on the frame 1 by the intermediate of a flexible connection of known type (not shown) permitting small movements of motor 37 relatively to the frame 1. When the machine is at rest, the milling-cutter 34 and the feeler 32 are in alignment with supporting axle 31 and the rotary shaft of motor 37. When the cut-milling head 30 oscillates on both sides of this neutral position, this results only in small displacements of the motor 37.

Said oscillations are produced by the return spring 33 in the one direction and by the reaction of gauge 27 on the feeler 30 in the opposite direction.

Second vice 14 is located under first vice 6 and both are realized in the same manner. In the present example, second vice 14 is substantially a mirror image of first vice 6, excepting what concerns the first gauge 27. Second vice 14 comprises a support 38 (FIG. 9) slidably mounted on lower guide 3. Said support 38 is rigidly secured to a fixed jaw 39 and it pivotally carries a counter-jaw 40. The latter is provided with a roller 21, rolling on the profiled face of cam 5 in order to urge said counter-jaw 40 towards the fixed jaw 39 against a return-spring 32. To the support 38 is rigidly secured a gauge 43 having a profile identical to the second half of the profile to be cut on the spectacle-leg or the like.

A cut-milling head 63 (FIGS. 1 and 10) is hinged to a stationary axle 34 carried by the transverse bar 29. As previously described with respect to cut-milling head 30, said cut-milling head 63 comprises a feeler 45 adapted to roll on the gauge 43 when the latter is moved along the lower guide 3 together with second vice 14. This results in small oscillations of cut-milling head 63 against a return-spring 46. Cut-milling head 63 is provided with a milling-cutter 47 rotated by a pulley 48 and a belt 49, the latter being connected to a motor 50 mounted on the frame 1 by the intermediate of a flexible connection of known type, as previously described for the motor 37.

The vices 6 and 14 are opposite one another when both of them are located in the middle plane 20. At this position, the jaws 21, 39 and counter-jaws 24, 40 (FIG. 9) are located on both sides of a cutting-off saw 51, the latter being pivotally carried by the stationary frame 1.

The operating mechanism 12, 16, 17, 18 reciprocates second vice 14 between both planes 20 and 52 (FIG. 2) which correspond to stroke-ends.

Cam 5 has a profile adapted to open the jaws of second vice 14 at each stroke-end, that it in the planes 20 and 52; on the contrary, second vice 14 is kept in gripping position during all intermediate steps.

To facilitate an automatic operation of the machine, it is advantageous to mount the vices 6 and 14 vertically above one another (FIG. 1), although they have been illustrated in a horizontal position in FIGS. 7 to 11 for the clarity of the drawings. In operation, the machine is supplied with a rectangular plate 53 having great dimensions (FIGS. 7, 8 and 9), made of plastics or the like. If vices 6 and 14 are both vertically orientated, said plate 53 is lowered by gravity at each fabrication step.

Figure 4:
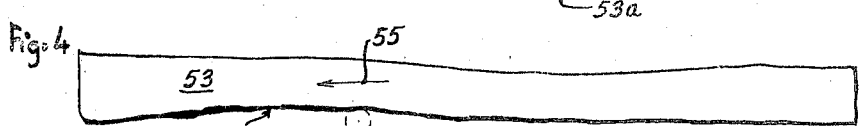
FIG. 4 illustrates the same plate during mill-cutting of the profile first half.
Figure 5:
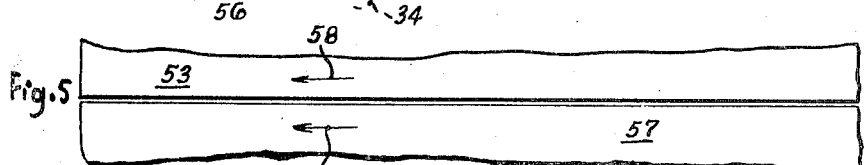
FIG. 5 shows the plate after gripping of its protruding portion in the second vice and cutting off of said protruding portion.
Figure 6:
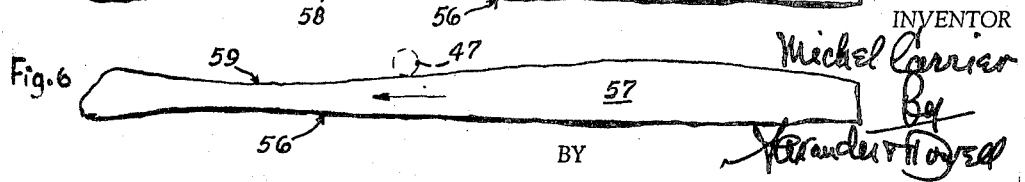
FIG. 6 illustrates the cut-off end portion during mill-cutting of the profile second half.

The operation is as follows:

When vices 6 and 14 are at the end positions indicated by planes 28 and 52 (FIGS. 1, 2, 7), the plastics plate 53 is placed between the jaws 21 and 24 of first vice 6, the latter being opened at that time. Said plate 53 is automatically positioned by gravity against a thrust member 54. Plate 53 is gripped by the jaws of first vice 6 as soon as the latter is moved towards the middle plane 20. At the same time, the gauge 27 is displaced along feeler 22 (FIGS. 2 and 8) which results in controlled transverse displacements of milling-cutter 34 about axle 31. At the beginning, the plate 53 had a straight front edge 53a (FIG. 3) and the latter is cut in a profile 56 as first vice 6 and plate 53 are displaced along said milling-cutter 34 in the direction of arrow 55 (FIG. 4). Said profile 56 is identical to the profile of gauge 27 and it defines the first side of the spectacle-leg to be cut.

When first vice 6 is brought close to the middle plane 20, the protruding portion 57 of plate 53 is engaged between the opened jaws 39 and 40 of second vice 14 (FIG. 9). The latter is then automatically locked and the protruding portion 57 is separated from the remainder of plastics plate 53 by displacement of the whole unit 6, 14, 53, on the cutting-off saw 51 (FIGS. 1 and 9), in the direction of arrows 58. For this purpose, the movements of first vice 6 and second vice 14 are not exactly in opposite phase since, during a short space of time, vices 6 and 14 are both moved together on each side of cutting-off saw 51. During this operation, the plastics plate 53 is retained by first vice 6 and its protruding portion 57 by second vice 14. For example, the phase displacement between both reciprocating motions may be smaller than 180°, namely 120° or 160°, that is, the movement of second vice 14 has 120° or 160° phase lag with respect to the movement of first vice 6. Said phase lagging results from an angular difference of orientation between grooves 11 and 19.

Immediately after this cutting-off operation, vices 6 and 14 are again moved off on each side of middle plane 20 respectively in the direction of planes 28 and 52. First vice 6 brings back the remainder of plate 53 which is automatically lowered again by gravity towards thrust member 54 as soon as said first vice 6 is opened at the machine original position. At the same time, second vice 14 moves the cut off portion 57 (FIGS. 6 and 7) along milling-cutter 47 in order to cut thereon a profile 51 by means of gauge 33 which is displaced at the same time along the feeler 45. When the second vice 14 comes at the stroke end corresponding to plane 52, it is automatically opened and the machined portion 57 is released. Said portion 27 may be a spectacle-leg cut on both sides in the desired profile 56, 59. Said machine portion 57 is removed automatically by gravity after opening of second vice 14.

It will be appreciated that the operation of the machine object of the invention is entirely automatic. The position adjustment of plastics plate 53 at the beginning of each process is performed by gravity and it is only sufficient to gather under plane 52 the machined portions 57 falling from second vice 14 when the latter is opened.

Minor changes may be made without departing from the scope of the invention as claimed. More particularly, it is possible to replace the milling-cutters 34 and 47 by cylindrical, conical or profiled cutters of known type. Moreover, the profiles of gauges 27 and 43 may be chosen in order to obtain parts cut at any contour, said parts being for example the main portion of spectacle-frames or any other elements.

I claim:

1. In a machine for cutting spectacle-legs or the like from a plastics plate, said machine having a stationary frame, the combination of: a first vice slidably mounted on the machine frame and gripping said plate, the protruding portion of which is displaced along a first milling-cutter having its axis moved transversely with respect to said plate by means of a first gauge-and-feeler mechanism in order to cut on said plate protruding portion the first half of the desired profile, a second vice adapted to automatically grip said plate protruding portion automatically removed from said first vice, and to displace it in a longitudinal movement along a second milling-cutter having its axis moved transversely with respect to said plate protruding portion by means of a second gauge-and-feeler mechanism in order to cut on said plate protruding portion the second half of the desired profile; means to reciprocate said first and second vice in synchronous motions; and actuating means to lock and open automatically said first and second vice at predetermined positions.

2. A machine as claimed in claim 1, wherein said reciprocating means comprise two couples of articulated levers, each of them consisting of a first lever hinged to a stationary axis and a second lever pivotally connecting said first lever to the corresponding first or second vice, both first levers being located on each side of a rotary plate and having a side roller guided in a close-profiled groove set off centre on each side of said rotary plate, both close-profiled grooves having a 120° to 180° angular difference of orientation with respect to the rotary axis of said rotary plate.

3. A machine as claimed in claim 1, wherein said actuating means comprise, for each of the said first and second vice, a cam rigidly secured to the said machine frame, and a roller mounted on said vice, said roller being urged against said cam by a spring in the vice-opening direction.

4. A machine as claimed in claim 1, wherein each of said first and second milling-cutters is mounted on an independent cut-milling head pivotally carried by the said machine frame, said cut-milling head oscillating under action of the said corresponding gauge-and-feeler mechaanism while a motor flexibly mounted on said machine frame drives said milling-cutter by means of a belt-and-pulley system.

5. A machine as claimed in claim 1, wherein said plastics plate has dimensions greater than the dimensions of the said spectacle-leg or the like to be machined, a cutting-off saw being provided between said first and second vice to separate said plate protruding portion gripped in said second vice, from the remainder of said plate retained by said first vice.

No references cited.

WILLIAM W. DYER, Jr., *Primary Examiner.*

G. A. DOST, *Assistant Examiner.*